(12) United States Patent  
Mostov et al.

(10) Patent No.: US 8,823,581 B2  
(45) Date of Patent: Sep. 2, 2014

(54) SYSTEM AND METHOD FOR DETECTING DANGEROUS OBJECTS AND SUBSTANCES

(75) Inventors: Kirill Mostov, Berkeley, CA (US); Kfim Liptsen, Berkeley, CA (US)

(73) Assignee: Radical Development Holding S.A. (CH)

( * ) Notice: Subject to any disclaimer, the term of this patent is extended or adjusted under 35 U.S.C. 154(b) by 56 days.

(21) Appl. No.: 11/951,915

(22) Filed: Dec. 6, 2007

(65) Prior Publication Data

US 2008/0211711 A1    Sep. 4, 2008

Related U.S. Application Data

(60) Provisional application No. 60/868,790, filed on Dec. 6, 2006.

(51) Int. Cl.
| | |
|---|---|
| G01S 13/34 | (2006.01) |
| G01S 13/86 | (2006.01) |
| G01S 13/89 | (2006.01) |
| G01S 7/41 | (2006.01) |
| G01S 13/00 | (2006.01) |
| G01S 7/02 | (2006.01) |

(52) U.S. Cl.
USPC ............... 342/128; 342/22; 342/27; 342/52; 342/55; 342/89; 342/90; 342/118; 342/175; 342/176; 342/179; 342/188; 342/195

(58) Field of Classification Search
USPC ......... 342/27, 28, 59, 82–103, 118, 125–145, 342/175, 176, 179, 188–197, 361–366, 21, 342/22, 25 R–25 F, 13–20, 29–51, 52–55, 342/70–72; 324/600, 629, 637, 638; 375/316, 322, 324, 328, 346, 350

See application file for complete search history.

(56) References Cited

U.S. PATENT DOCUMENTS

| | | | | |
|---|---|---|---|---|
| 3,750,163 | A * | 7/1973 | Hecker | 342/45 |
| 3,922,673 | A * | 11/1975 | Bishop | 342/45 |
| 3,945,006 | A * | 3/1976 | Cleeton | 342/45 |

(Continued)

FOREIGN PATENT DOCUMENTS

| | | |
|---|---|---|
| WO | WO 03/091715 A1 | 11/2003 |
| WO | PCT/US2007/086664 | 7/2008 |

OTHER PUBLICATIONS

U.S. Appl. No. 11/343,560; Office Action mailed Jan. 18, 2008.
U.S. Appl. No. 11/343,560; Office Action mailed Sep. 11, 2008.

(Continued)

*Primary Examiner* — Bernarr Gregory
(74) *Attorney, Agent, or Firm* — Orrick, Herrington & Sutcliffe LLP (57) ABSTRACT

A system and method for detecting dangerous objects and substances are disclosed. According to one embodiment, a method comprises generating a microwave signal that is reflected by a target to render one or more reflected signals. The one or more reflected signals are received at an antenna array. The one or more reflected signals are converted into digital reflected signals. The microwave signal is converted into a digital signal. The digital reflected signals and the digital signal are processed to determine the three dimensional position of the target. The digital reflected signals and the digital signal are processed to identify the target. The digital reflected signals and the digital signal are processed to determine a state of the target; and determine whether the target a dangerous object.

18 Claims, 9 Drawing Sheets

(56) References Cited

U.S. PATENT DOCUMENTS

| | | | |
|---|---|---|---|
| 3,949,397 A * | 4/1976 | Wagner et al. | 342/45 |
| 3,956,747 A * | 5/1976 | Leypold et al. | 342/43 |
| 4,025,920 A * | 5/1977 | Reitboeck et al. | 342/13 |
| 4,155,087 A * | 5/1979 | Okrent | 342/189 |
| 4,247,815 A * | 1/1981 | Larsen et al. | 324/638 |
| 4,320,298 A * | 3/1982 | Buford et al. | 342/13 |
| 4,321,601 A * | 3/1982 | Richman | 342/191 |
| 4,323,898 A * | 4/1982 | Barnes et al. | 342/90 |
| 4,323,899 A * | 4/1982 | Barnes et al. | 342/90 |
| 4,403,314 A * | 9/1983 | Tournois | 342/192 |
| 4,546,355 A * | 10/1985 | Boles | 342/179 |
| 4,549,184 A * | 10/1985 | Boles et al. | 342/25 B |
| 4,563,686 A * | 1/1986 | Boles | 342/25 C |
| 4,566,009 A * | 1/1986 | Hanni et al. | 342/45 |
| 4,694,297 A * | 9/1987 | Sewards | 342/45 |
| 4,723,124 A * | 2/1988 | Boles | 342/25 C |
| 4,792,796 A | 12/1988 | Bradshaw et al. | |
| 4,821,291 A | 4/1989 | Stevens et al. | |
| 4,862,176 A * | 8/1989 | Voles | 342/45 |
| 4,879,756 A | 11/1989 | Stevens et al. | |
| 4,926,868 A | 5/1990 | Larsen | |
| 4,937,586 A | 6/1990 | Stevens et al. | |
| 5,051,748 A | 9/1991 | Pichot et al. | |
| 5,073,782 A * | 12/1991 | Huguenin et al. | 342/179 |
| 5,124,709 A * | 6/1992 | Baron et al. | 342/192 |
| 5,177,432 A | 1/1993 | Waterhouse et al. | |
| 5,227,800 A * | 7/1993 | Huguenin et al. | 342/179 |
| 5,245,534 A | 9/1993 | Waterhouse et al. | |
| 5,337,053 A * | 8/1994 | Dwyer | 342/90 |
| 5,339,082 A * | 8/1994 | Norsworthy | 342/90 |
| 5,341,141 A * | 8/1994 | Frazier et al. | 342/129 |
| 5,361,072 A * | 11/1994 | Barrick et al. | 342/133 |
| 5,374,815 A | 12/1994 | Waterhouse et al. | |
| 5,375,146 A * | 12/1994 | Chalmers | 375/350 |
| 5,406,842 A | 4/1995 | Locke | |
| 5,455,590 A * | 10/1995 | Collins et al. | 342/179 |
| 5,472,309 A | 12/1995 | Bernard et al. | |
| 5,504,487 A * | 4/1996 | Tucker | 342/90 |
| 5,507,291 A | 4/1996 | Stirbl et al. | |
| 5,532,465 A | 7/1996 | Waterhouse et al. | |
| 5,533,606 A | 7/1996 | Yuyama | |
| 5,561,431 A * | 10/1996 | Peele et al. | 342/90 |
| 5,612,700 A * | 3/1997 | Tucker | 342/90 |
| 5,646,616 A | 7/1997 | Komatsu | |
| 5,670,886 A | 9/1997 | Wolff et al. | |
| 5,875,434 A | 2/1999 | Matsuoka et al. | |
| 5,877,962 A | 3/1999 | Redcliffe | |
| 5,905,380 A | 5/1999 | Weiner et al. | |
| 5,943,841 A | 8/1999 | Wunscher | |
| 6,032,127 A | 2/2000 | Schkolnick et al. | |
| 6,057,761 A | 5/2000 | Yukl | |
| 6,121,920 A * | 9/2000 | Barrett | 342/188 |
| 6,208,908 B1 | 3/2001 | Boyd et al. | |
| 6,222,481 B1 * | 4/2001 | Abrahamson et al. | 342/90 |
| 6,308,109 B1 | 10/2001 | Yuyama et al. | |
| 6,337,654 B1 * | 1/2002 | Richardson et al. | 342/90 |
| 6,359,582 B1 * | 3/2002 | MacAleese et al. | 342/22 |
| 6,437,728 B1 * | 8/2002 | Richardson et al. | 342/90 |
| 6,505,093 B1 | 1/2003 | Thatcher | |
| 6,573,732 B1 | 6/2003 | Reimer | |
| 6,720,905 B2 * | 4/2004 | Levitan et al. | 342/22 |
| 6,856,272 B2 * | 2/2005 | Levitan et al. | 342/22 |
| 6,927,728 B2 | 8/2005 | Vook et al. | |
| 6,965,340 B1 * | 11/2005 | Baharav et al. | 342/22 |
| 6,967,612 B1 * | 11/2005 | Gorman et al. | 342/22 |
| 6,972,714 B1 * | 12/2005 | Baharav et al. | 342/179 |
| 6,982,666 B2 * | 1/2006 | Temes et al. | 342/22 |
| 7,028,861 B2 | 4/2006 | Sayers et al. | |
| 7,046,015 B2 | 5/2006 | Suginouchi et al. | |
| 7,046,186 B2 * | 5/2006 | Rosenberg et al. | 342/45 |
| 7,049,963 B2 | 5/2006 | Waterhouse | |
| 7,088,290 B2 | 8/2006 | Ohno et al. | |
| 7,098,645 B1 | 8/2006 | Zhu et al. | |
| 7,183,963 B2 * | 2/2007 | Lee et al. | 342/22 |
| 7,196,654 B2 * | 3/2007 | Edwards et al. | 342/43 |
| 7,295,149 B1 * | 11/2007 | Wolf | 342/90 |
| 7,385,549 B2 * | 6/2008 | Lovberg et al. | 342/22 |
| 7,385,552 B2 * | 6/2008 | Archer et al. | 342/179 |
| 7,450,052 B2 * | 11/2008 | Hausner et al. | 342/22 |
| 2002/0057216 A1 * | 5/2002 | Richardson et al. | 342/90 |
| 2003/0179126 A1 * | 9/2003 | Jablonski et al. | 342/22 |
| 2003/0193430 A1 | 10/2003 | Gresham et al. | |
| 2004/0041724 A1 * | 3/2004 | Levitan et al. | 342/22 |
| 2004/0053641 A1 | 3/2004 | Leung et al. | |
| 2004/0069849 A1 | 4/2004 | Stevens et al. | |
| 2004/0077943 A1 | 4/2004 | Meaney et al. | |
| 2004/0100379 A1 | 5/2004 | Boman | |
| 2004/0113783 A1 | 6/2004 | Yagesh | |
| 2004/0119646 A1 | 6/2004 | Ohno et al. | |
| 2004/0149822 A1 | 8/2004 | Stevens et al. | |
| 2004/0201454 A1 | 10/2004 | Waterhouse | |
| 2004/0205350 A1 | 10/2004 | Waterhouse et al. | |
| 2005/0007124 A1 | 1/2005 | Tsuji | |
| 2005/0029149 A1 | 2/2005 | Leung | |
| 2005/0029345 A1 | 2/2005 | Waterhouse et al. | |
| 2005/0043850 A1 | 2/2005 | Stevens et al. | |
| 2005/0062640 A1 * | 3/2005 | Edwards et al. | 342/42 |
| 2005/0073310 A1 | 4/2005 | Weatherall et al. | |
| 2005/0083213 A1 | 4/2005 | Stevens et al. | |
| 2005/0086983 A1 | 4/2005 | Stevens et al. | |
| 2005/0093733 A1 | 5/2005 | Lovberg et al. | |
| 2005/0104603 A1 | 5/2005 | Peschmann et al. | |
| 2005/0107693 A1 | 5/2005 | Fear et al. | |
| 2005/0113703 A1 | 5/2005 | Farringdon et al. | |
| 2005/0128131 A1 * | 6/2005 | Rosenberg et al. | 342/45 |
| 2005/0149226 A1 | 7/2005 | Stevens et al. | |
| 2005/0156780 A1 | 7/2005 | Bonthron et al. | |
| 2005/0205817 A1 | 9/2005 | Marcichow et al. | |
| 2005/0251330 A1 | 11/2005 | Waterhouse et al. | |
| 2006/0124662 A1 | 6/2006 | Reynolds et al. | |
| 2006/0128023 A1 | 6/2006 | Waterhouse et al. | |
| 2006/0164232 A1 | 7/2006 | Waterhouse | |
| 2006/0181413 A1 | 8/2006 | Mostov | |
| 2006/0220857 A1 | 10/2006 | August et al. | |
| 2006/0232417 A1 | 10/2006 | August et al. | |
| 2006/0258896 A1 | 11/2006 | Haber et al. | |
| 2007/0171119 A1 | 7/2007 | Dwelly et al. | |
| 2007/0194976 A1 | 8/2007 | Reed et al. | |
| 2007/0194982 A1 | 8/2007 | Stove | |
| 2007/0205937 A1 | 9/2007 | Thompson et al. | |
| 2010/0027737 A1 | 2/2010 | Mostov | |

OTHER PUBLICATIONS

U.S. Appl. No. 11/343,560; Notice of Allowance mailed Feb. 2, 2009.
PCT/US2008/084240—PCT Search Report and Written Opinion, Feb. 4, 2009, Kirsen Technologies Corporation.
PCT/US2008/081200—PCT Search Report and Written Opinion, Dec. 23, 2008, Kirsen Technologies Corporation.
U.S. Appl. No. 12/258,259; Office Action mailed Sep. 20, 2010.
U.S. Appl. No. 12/258,259; Notice of Allowance mailed Feb. 3, 2011.
Office Action, IL Application No. 199200, Mar. 25, 2012.

* cited by examiner

Fig. 7 r = 300GHz, L= 5m, D = 0.5m

SYSTEM AND METHOD FOR DETECTING DANGEROUS OBJECTS AND SUBSTANCES

The present application claims the benefit of and priority to U.S. Provisional Patent Application No. 60/868,790 filed on Dec. 6, 2006, and is hereby, incorporated by reference.

FIELD

The field of the invention relates generally to object monitoring and detection systems and more particularly relates to a system and method for detecting dangerous objects and substances.

BACKGROUND

In today's world, the task of detecting concealed bombs and weapons is becoming more and more important. The higher the resolution of the radio image, the higher the probability of concealed dangerous object detection and the lower the false alarm rate. However, presently available systems do not provide a mobile yet economical solution to detect dangerous objects by reconstructing discernible images of scanning objects.

Most of the current systems for detecting explosive devices and weapons are based on electromagnetic field technology. Such systems require individual objects to pass through a fixed passageway. When metallic objects pass through the passageway, a warning signal is activated indicating a change in magnetic flux. This type of system simply detects metal objects making no determination relative to the amount of metal present. Keys, jewelry, watches, and metal-framed eyeglasses may all trigger such a system.

Another type of detection system generates a microwave image of an object in addition to optical image information. While microwave imaging can provide additional information on concealed objects when used in conjunction with an optical image, microwave imaging still lacks the precision necessary for accurate weapon recognition.

SUMMARY

A system and method for detecting dangerous objects and substances are disclosed. According to one embodiment, a method comprises generating a microwave signal that is reflected by a target to render one or more reflected signals. The one or more reflected signals are received at an antenna array. The one or more reflected signals are converted into digital reflected signals. The microwave signal is converted into a digital signal. The digital reflected signals and the digital signal are processed to determine the three dimensional position of the target. The digital reflected signals and the digital signal are processed to identify the target. The digital reflected signals and the digital signal are processed to determine a state of the target; and determine whether the target is a dangerous object.

BRIEF DESCRIPTION OF THE DRAWINGS

The accompanying drawings, which are included as part of the present specification, illustrate the presently preferred embodiment of the present invention and together with the general description given above and the detailed description of the preferred embodiment given below serve to explain and teach the principles of the present invention.

DETAILED DESCRIPTION

A system and method for detecting dangerous objects and substances are disclosed. According to one embodiment, a method comprises generating a microwave signal that is reflected by a target to render one or more reflected signals. The one or more reflected signals are received at an antenna array. The one or more reflected signals are converted into digital reflected signals. The microwave signal is converted into a digital signal. The digital reflected signals and the digital signal are processed to determine the three dimensional position of the target. The digital reflected signals and the digital signal are processed to identify the target. The digital reflected signals and the digital signal are processed to determine a state of the target; and determine whether the target is a dangerous object.

The present method and system detects and identifies dangerous objects hidden under clothes or in luggage at a distance, for example at 7 meters. Objects of larger size such as a suicide belt with metal parts may be detected at distances of up to 50 meters, according to one embodiment. The device also presents a high-resolution radio image of the target of interest for manual analysis.

The present method and system allows for remote physiological parameters measurement and psycho-physiological information of the target by remote detection of hostile intent.

In the following description, for the purposes of explanation, specific nomenclature is set forth to facilitate an understanding of the various inventive concepts disclosed herein. However, it will be apparent to one skilled in the art that these specific details are not required in order to practice the various inventive concepts disclosed herein.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, and magnetic-optical disks, read-only memories, random access memories, EPROMs, EEPROMs, magnetic or optical cards, or any type of media suitable for storing electronic instructions, and each coupled to a computer system bus.

The methods presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Figure 1:
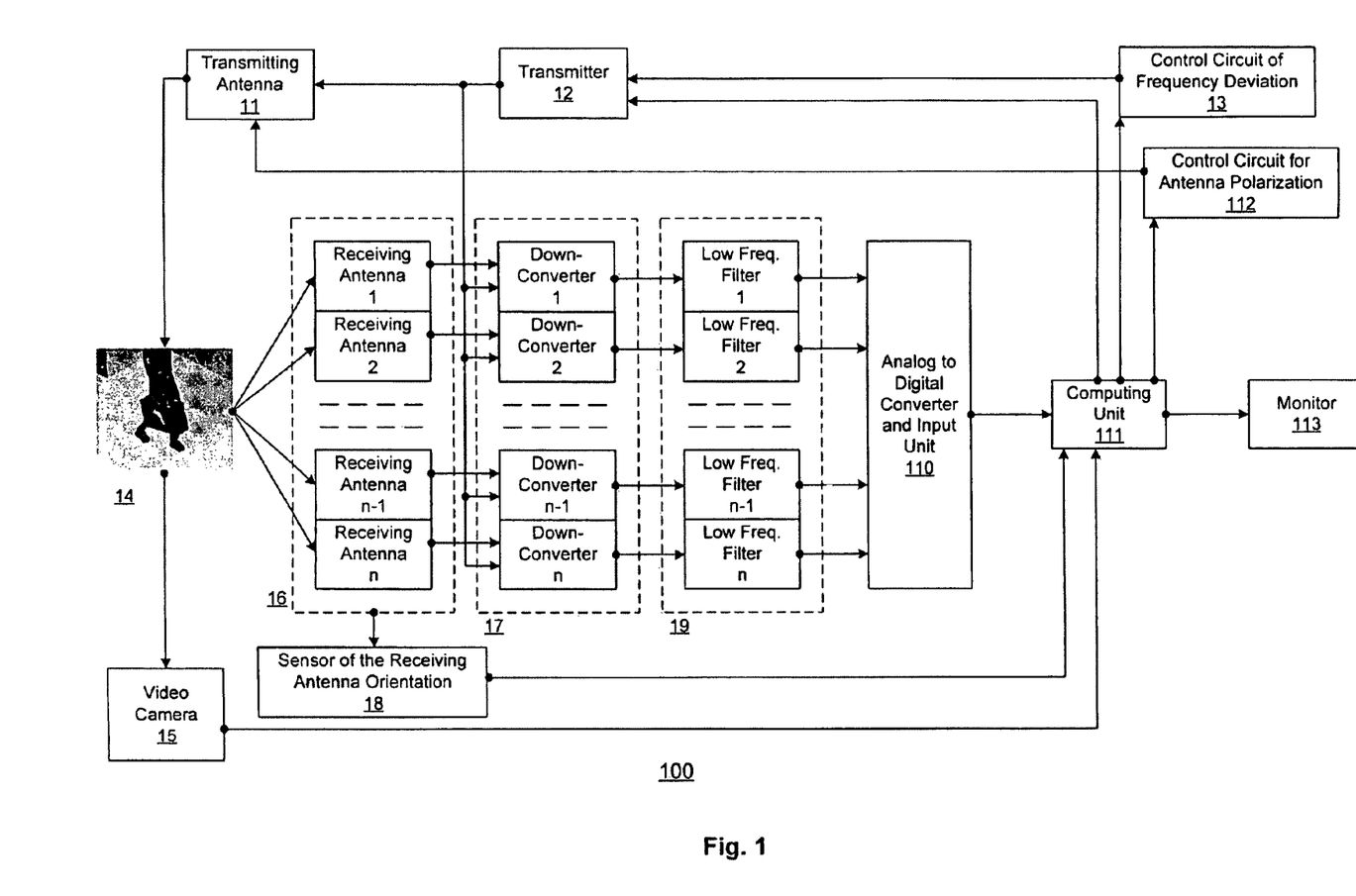
FIG. 1 is a block diagram of an exemplary radioscopic device (RSD), according to one embodiment.

FIG. 1 is a block diagram of an exemplary radioscopic device (RSD), according to one embodiment. A rsd 100 comprises a transmitter 12, a transmitting antenna 11, an array of receiving antennas 16 with separate data channels for each antenna, a sensor 18 for receiving antenna orientation, down converters 17, with one down converter for each receiving data channel, low frequency filters 19, with one low frequency filter for each receiving data channel, an analog-to-digital converter 110, a computing unit 111, a control circuit of frequency deviations 13, a control circuit for antenna polarization 112, an optional video camera 15 and a monitor 113.

The transmitter 12 generates a signal to be transmitted by the transmitting antenna 11. The signal is also sent to the down converters 17 for signal processing. The signals transmitted by the transmitting antenna 11 are reflected by the exposed object 14. The reflected signals are received by the array of receiving antennas 16. The reflected signals received by antennas 16 are transferred to down converters 17 via individual channels. Each down converter 17 multiplies the signals that are transmitted by transmitter 12 and received by antennas 16. After conversions the down-converted signals are processed in the low frequency filters 19, where the low-frequency components of the down-converted signals are isolated in each channel and then processed by the analog-to-digital converter 110. The digital signal data provided by A/D converter 110 delivered to computing unit 111 where the radar image of the exposed object 14 is constructed and displayed on the monitor screen 113.

When equipped with an optional video camera 15, the RSD 100 aims at the object 14 using a video image produced by video camera 15 before transmitting the signal with the transmitting antenna 11. The video image can be further processed by the computing unit 111 and used to construct a composite image of the exposed object 14 in combination with the radar image of the exposed object 14 discussed above.

In order to detect dangerous objects, RSD 100 includes a control circuit for antenna polarization 112 to produce and transmit signals with various polarizations. The RSD's transmitting and receiving antennas are also polarized. The polarization plane of the transmitted signal may be parallel or orthogonal to the polarization planes of the receiving antennas. This feature facilitates the detection of dangerous objects by analyzing the depolarization of the received signals.

Figure 2A:
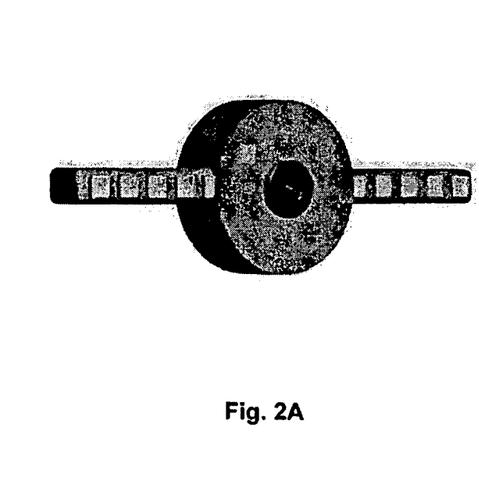
FIG. 2A illustrates an exemplary antenna array, according to one embodiment.
Figure 2B:
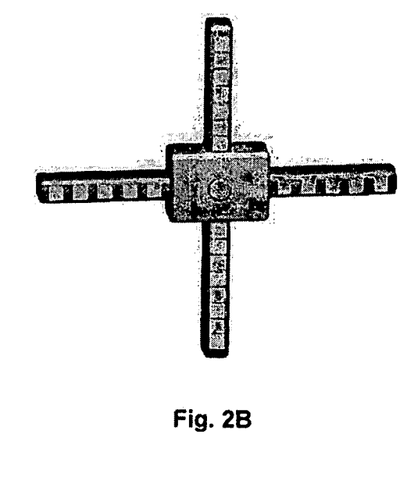
FIG. 2B illustrates an exemplary antenna array, according to another embodiment.

FIG. 2A illustrates an exemplary antenna array, according to one embodiment. FIG. 2B illustrates an exemplary antenna array, according to another embodiment. The strategic placement of receiving antennas 16 in arrays of two orthogonal rows makes it possible to determine the spatial coordinates of the exposed object 14. If a single row of receiving antennas is used as shown in FIG. 2A instead of two orthogonal rows as shown in FIG. 2B, then a power drive is used to rotate the row. The complete image is constructed by jointly processing signals received in at least two row positions. In order to get better image quality, these two positions may be orthogonal to each other. Further enhancement of the radar image can be obtained by receiving signals in intermediate positions. In such a case, the drive is equipped with a position sensor that provides the computing unit 111 with the position data to construct the radar image.

Figure 3:
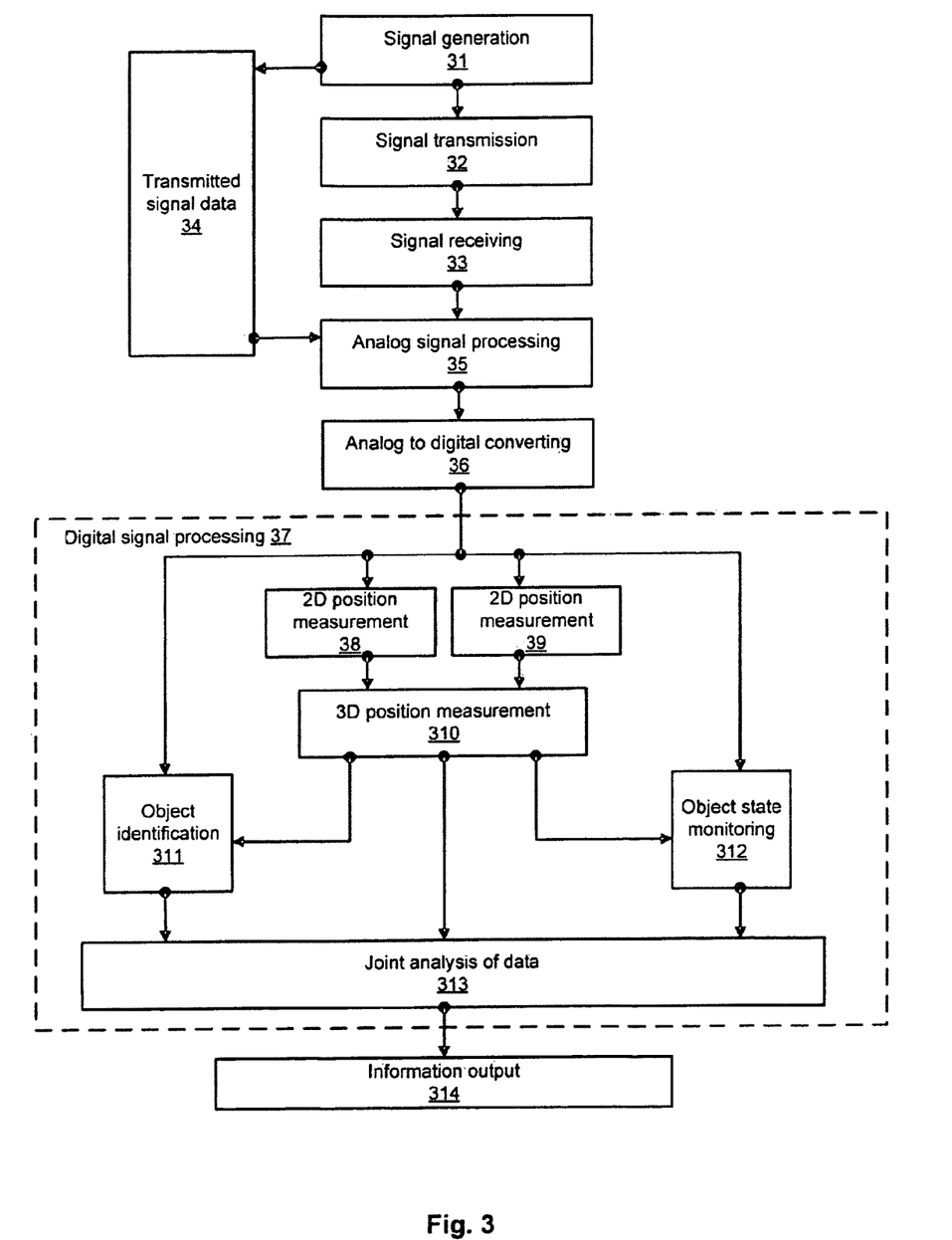
FIG. 3 illustrates an exemplary process for object detection and radar imaging, according to one embodiment.

FIG. 3 illustrates an exemplary process for object detection and radar imaging, according to one embodiment. When the RSD 100 is powered on, a signal is generated (31), transmitted (32) and received (33). Analog signal processing (35) receives signals from each of the receiving antennas and the transmitted signal data 34 from transmitter 12 to the down converters 17.

After the analog signal processing in the low frequency filters 19 has been completed and the signals have been digitized (36), digital signal processing (37) takes place. The signal processing involves calculations that: (a) determine the object position in 3D space (310) on the basis of 2D coordinates (38 and 39); (b) complete the target identification (311); and (c) determine the psycho-physiological attributes of living humans (312). Calculation results are jointly analyzed (313) and the radar image is constructed and displayed on the screen (314).

For object position measurement in 2D coordinates, both the distance to the object 14 and the object's azimuth are calculated.

Figure 4:
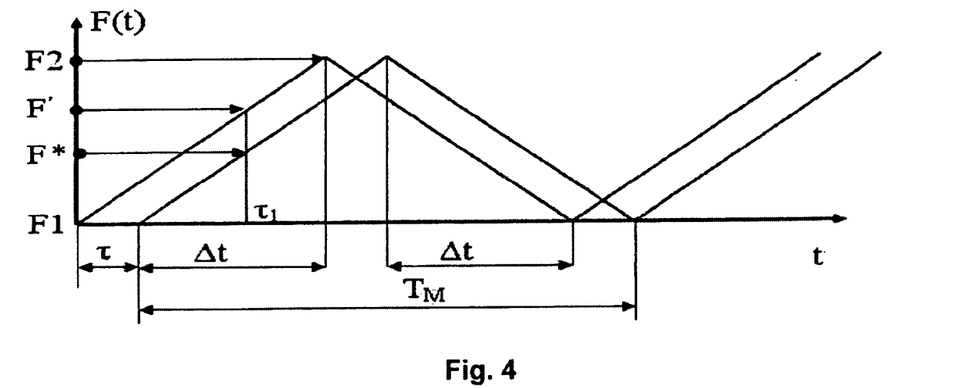
FIG. 4 illustrates an exemplary process for determining the distance to a target, according to one embodiment.

For calculating the distance to the object 14, the high-frequency signals received by antennas 16 are compared against the transmitted signals with continuous frequency change modulation. FIG. 4 illustrates an exemplary process for determining the distance to a target, according to one embodiment. The transmitting antenna 11 emits a signal F'. The received analog signal is converted by down converters 17. A low-frequency filter isolates the low-frequency component of the analog signal carrying the target distance data. The analog-to-digital converter 110 samples the input signal to produce a set of N points. The set of N points is calculated by the following equation, $$N = \left(\frac{T_M}{2} - \tau\right) \cdot F_d,$$

wherein $T_M/2$ is the period of frequency sweep from F1 to F2 and $\tau$ is time interval between signal transmission and signal reception and $F_d$ is the analog input sampling rate.

A distance and an azimuth are calculated by a 2D fast Fourier transformation of a data array with dimension nN, wherein n is the number of antenna elements in the row. This results in a bi-variable function $f(u,v)$. The argument u corresponds to the frequency of the received signal, allowing for the determination of the distance to target. The argument v corresponds to the phase difference between the signals received by the neighboring antennae, allowing for the computation of the azimuth of the target.

An exemplary calculation of the distance to an object 14 is given. The emitted signal F', upon reaching the target 14 at R distance from a rsd 100, is reflected and subsequently received by a receiving antenna 16 at the frequency of F. The emitted signal is received with a time delay, $\tau=2R/c$, where c is the speed of light in air. The received analog signal is converted by down converters 17. Low-frequency filter 19 isolates the low-frequency component of the analog signal, which after signal digitization can be used for the derivation of the frequency, $F_R$ which is equal to the difference of frequencies F' and F at time $\tau 1$. Thus the distance to the target R is calculated by:

$$F' = F_1 + \frac{2(F_2 - F_1)}{T_M}\tau_1; F^* = F_1 + \frac{2(F_2 - F_1)}{T_M}(\tau_1 - \tau)$$
$$F_R = F' - F^* = \frac{4(F_2 - F_1)R}{cT_M}.$$

Therefore, $$R = \frac{cT_M(F' - F^*)}{4(F_2 - F_1)}.$$

Figure 5A:
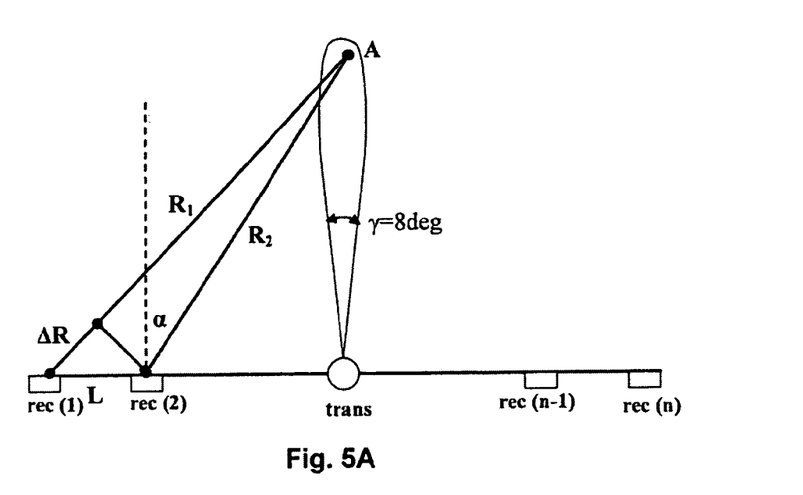
FIG. 5A illustrates an exemplary process for determining the azimuth of an object, according to one embodiment.

FIG. 5A illustrates an exemplary process for determining the azimuth of an object, according to one embodiment. A first receiving antenna, rec(1), of antenna array 16 and a second receiving antenna, rec(2), of antenna array are used.

A distance difference, $\Delta R$, from rec(1) and rec(2) to A is calculated. The phase of the signal received by rec(1) is delayed from the phase of the signal received by rec(2) by:

$$\Delta \varphi = \frac{\Delta R}{\lambda} 2\pi = \frac{L \cdot \sin\alpha}{\lambda} 2\pi = k \cdot L \cdot \sin\alpha,$$

where $$k = \frac{2\pi}{\lambda}$$

and $\lambda$ is the wave length of the radiated (received) signal. The target azimuth $\alpha$ is obtained by calculating the values of $\Delta\phi$ and $\lambda$.

Figure 5B:
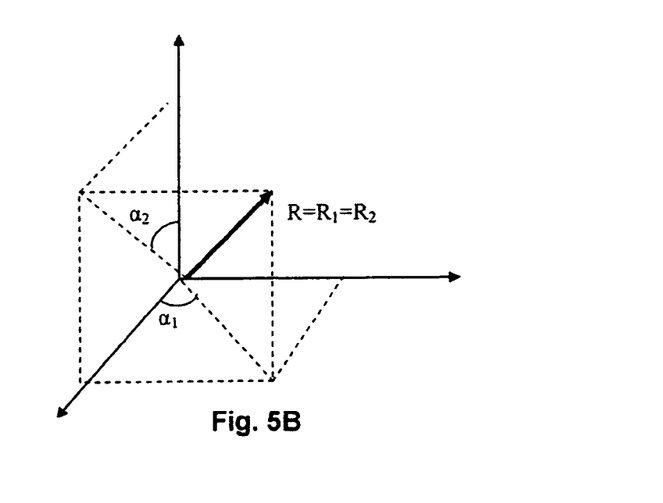
FIG. 5B illustrates an exemplary process for determining the 3D coordinates of an object, according to one embodiment.

3D position measurement uses at least two sets of 2D data. The two sets of 2D data are acquired by the receiving antennas located at different locations. The first data set is obtained when the receiving antenna array is positioned horizontally. When the first data set is processed, the distance to the target $R_1$ and the azimuth $\alpha_1$ in the horizontal plane is obtained. The second data set is obtained when the receiving antennae array is positioned vertically, for example after rotating the antenna array by 90 degrees or when a perpendicular antenna array is used as shown in FIG. 2B. During the processing of the second data set, the distance to the target $R_2$ and the azimuth $\alpha_2$ in the vertical plane are determined. The distances to the target $R_1$ and $R_2$ are equal as shown in FIG. 5B. Therefore, the values of three parameters are obtained to determine the 3D coordinates of the target: the distance to the target R and the two angles, $\alpha_1$ and $\alpha_2$.

Figure 6:
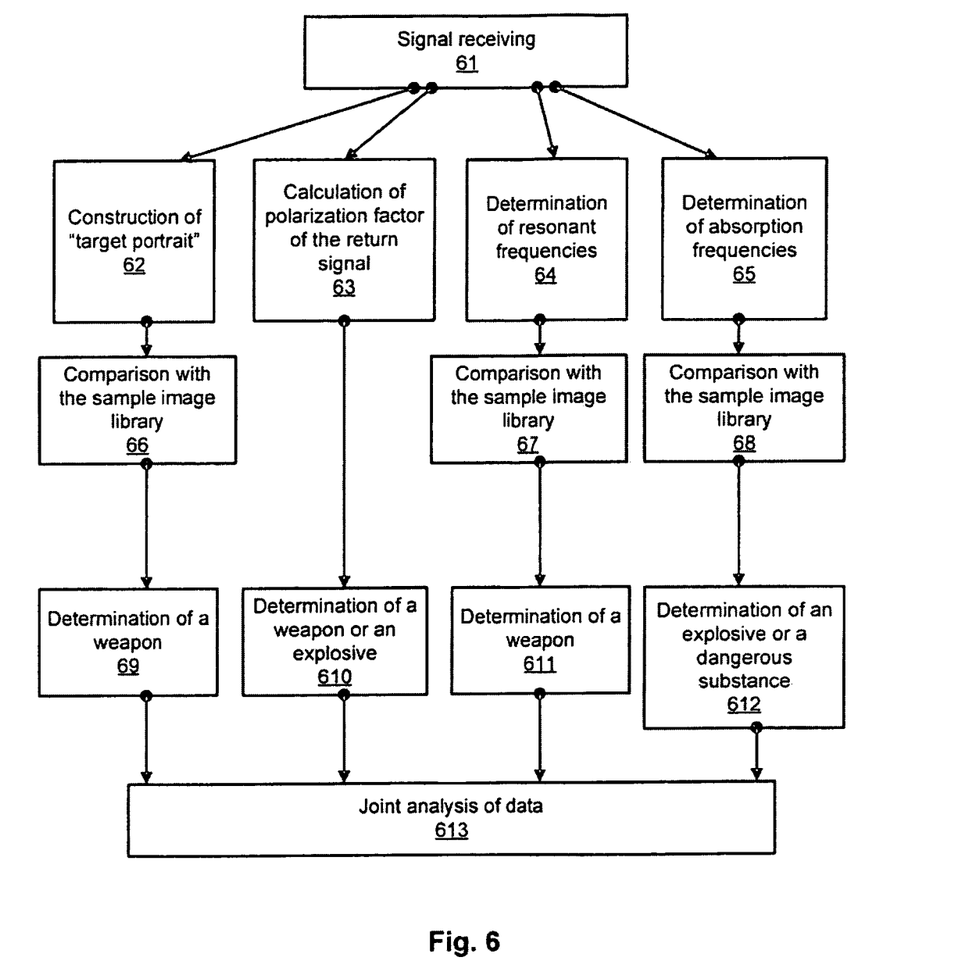
FIG. 6 illustrates a flow diagram of an exemplary process for target identification, according to one embodiment.

FIG. 6 illustrates a flow diagram of an exemplary process for target identification, according to one embodiment. The identification of the target 14 and identification of a weapon, explosive or dangerous substance are performed by the joint analysis of data (613) including a "target portrait" (62), the polarization factor of the return signal (63), the resonant frequency elements of the returned signal that are associated with the observed object (64), and the absorption frequency (65).

If the RSD 100 has a signal polarization block with a control circuit of antenna polarization, the carriage of concealed weapons and shrapnel is determined through the depolarization analysis of the signal reflected from the object 14.

The echo signal reflected from a target 14 has two components that are explained in the representation of the target as an object with a diffusive background and some bright dots. A background may appear diffused because of the object's roughness. The contribution of bright dots is greater than the contribution of the diffusive components in the reflected depolarized signal. Maximum depolarization occurs when the size of the observed small elements constitutes half wavelength. Small elements, for example, may be the shrapnel in a suicide belt, or bolts, ball-bearings, nuts, nails, fragments of metallic pieces. As an example, if the frequency is 50 GHz (Giga Hertz), then the wavelength is about 6 mm (millimeters), and a half-wavelength is about 3 mm. Small elements of the size of 3 mm would exhibit a maximum depolarization effect.

Multi-frequency radiation and the analysis of polarization patterns are applied to improve the image quality (e.g. correction of the bright spots effect). Due to digital phasing, a non-linear coherent algorithm is applied. Subsequent processing resolves any identification problems. A non-linear digital algorithm is applied for the resolution improvement and the object identification. Processing is performed in the time domain. In one embodiment, a non-linear iterative image space reconstruction algorithm (ISRA) is applied. ISRA has several advantages for the current application: (1) Gaussian noise is assumed, which is a good approximation for radiometry applications. (2) The solution of the equation is based on good convergence of the algorithm. (3) The approximation function is non-negative for the relevant range. (4) No additional assumptions are necessary for the transfer function such as invariance, symmetry, etc. (5) Although computationally intensive compared to other algorithms, ISRA features good robustness and results in significant improvement on resolution.

Polarization of the background is random and weakly dependent on the polarization of the probing signal. The diffusive background contributes to the reflected (diffused) signal. In contrast, bright dots of the target 14 make a significant contribution to the diffused signal. They are caused by the fact that the target has small mirrors normally focused to a line of sight. If the size of these mirrors is half of the wavelength (half wave dipole), the contribution to the diffused signal will be maximal. Because the bright dots of the observed object are noticeable because of their comparatively larger reflectivity to other dots of the general object background (neighboring dots)—a small mirror effect is observed. The presence of these small mirrors (bright spots) allows for the identification of typical threats (weapons, etc.) by their relative position with respect to each other and the background. The turn of the polarization plane of the diffused radiation depends on the orientation of the dipole. Therefore, if probing radiation is polarized either vertically or horizontally, and the dipole is focused under 45°, the diffused signal contains both vertical and horizontal polarization. The cross-polarization is evaluated by the polarization coefficient:

$$B = \frac{A_k - A_i}{A_k + A_i}$$

wherein $A_i$ and $A_k$ are the amplitudes of the received signals calculated at the vertical and horizontal polarization of the transmitting antenna.

If the target is a half-wave dipole rotated by 45° to the horizon, the depolarization coefficient B will be equal to zero. Since the actual target 14 has randomly oriented dipoles, the polarization factor ranges between 0 and 1. The lower the polarization factor, the greater the probability that a weapon or an explosive belt exists.

Small pieces of firearms and cold steel at a certain perspective also have depolarization abilities. As the weapon has fewer small pieces than an explosive belt, the coefficient of depolarization of an explosive belt and a weapon significantly differ due to the difference in the amount of "small pieces" expressed by the relationship, $$B_{weapon} > B_{explosive\_belt}.$$

Since RSD 100 detects moving and living humans, the detection of weapons and explosive belts can be done selectively for each irradiated person. This allows for armed persons to be isolated and displayed on the screen.

Figure 7:
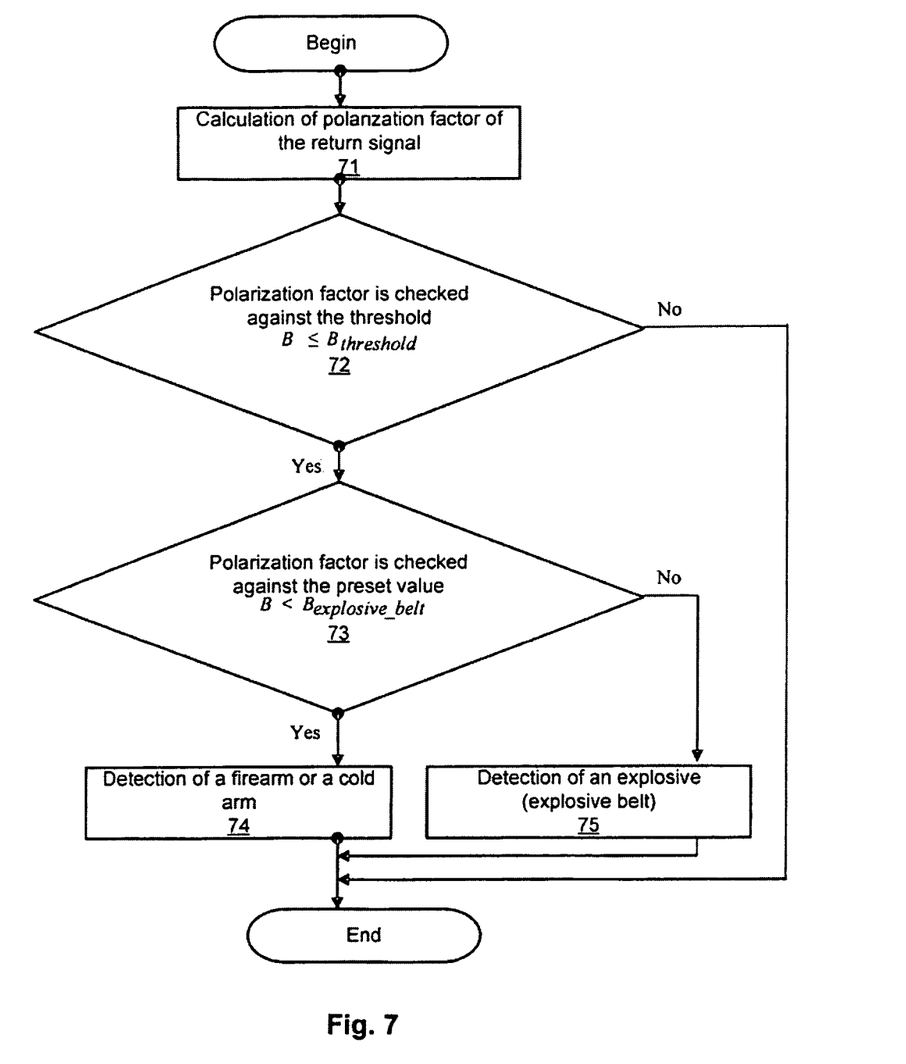
FIG. 7 illustrates a flow diagram for an exemplary weapon detection process, according to one embodiment.

FIG. 7 illustrates a flow diagram for an exemplary weapon detection process, according to one embodiment. When the polarization factor of a return signal has been calculated (71), the polarization factor B is checked (72) against an experimentally determined threshold $B_{threshold}$. If $B \leq B_{threshold}$, the polarization factor B of the signal being analyzed is checked (73) against the preset value $B_{explosive\_belt}$. If $B_{threshold} \geq B \geq B_{explosive\_belt}$, the decision is made (74) that the object carries firearms or cold arms. If $B < B_{explosive\_belt}$, the decision is made (75) that the object carries an explosive belt.

If the signal is reflected by an object of heterogeneous structure, a rsd 100 produces an array of radar cross sections of the object's points in the examined space. Using the return signal and the object coordinates in 3D space calculated from the return signal, a rsd 100 constructs the radar image ("target portrait" 62). Weapons are detected (69) by matching the "target portrait" with the sample image library (66).

Figure 8:
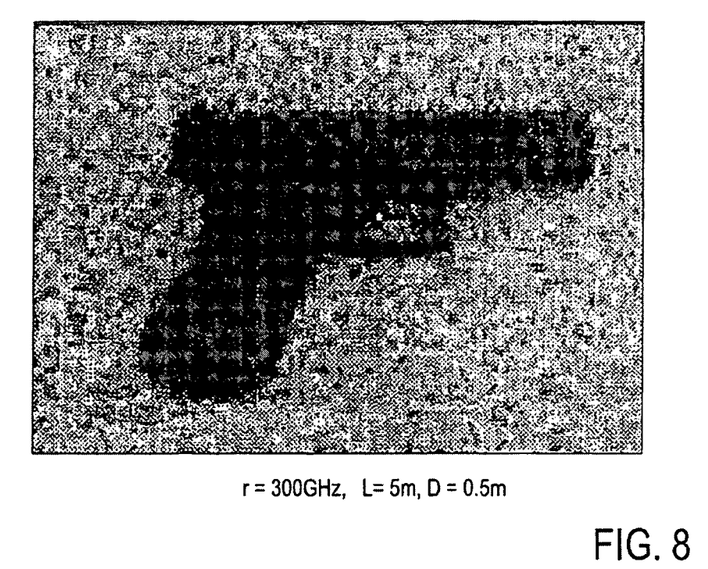
FIG. 8 illustrates an exemplary radioscopic image of a detected gun, according to one embodiment.

FIG. 8 illustrates an exemplary radioscopic image of a detected gun, according to one embodiment. Most weapons have high echoing capacity and the weapon parts that have their individual frequency responses can resonate when exposed to microwave signals. Returning to FIG. 6, the RSD 100 isolates the resonant frequencies (64). The isolated resonant frequencies are matched (67) against an experimentally acquired sample image library. RSD 100 determines if a weapon or an explosive belt is being carried (611).

To create a radioscopic image, computing unit 111 processes the return signal. For each point in space observable by RSD 100, the coordinates of the image point and the parameters of the return signal (e.g. signal intensity and the degree of polarization) are determined. The contrast (e.g. brightness) of each image point displayed on the monitor is computed based on the intensity of the signal: the stronger the signal, the darker (shade of gray) the image point is.

Figure 9:
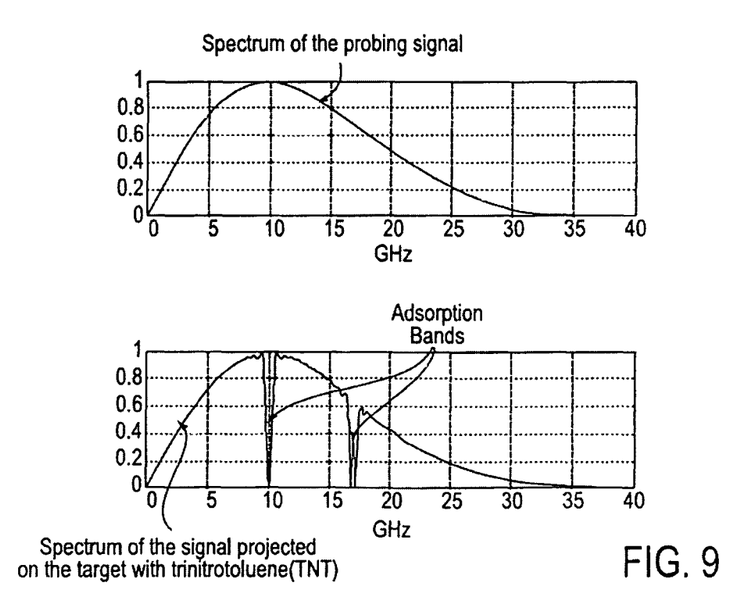
FIG. 9 illustrates an exemplary signal spectrum with absorption frequencies according to one embodiment.

Explosives and other dangerous substances exposed to microwave signals may absorb the radiation in certain frequency bands. FIG. 9 illustrates an exemplary signal spectrum with absorption frequencies according to one embodiment. The RSD 100 determines (65) the absorption frequencies. A radio signal is reflected by the observed object not only by its front surface (with respect to the device), but also by its rear surface. When a frequency-modulated signal is passing through the object to its rear surface, its amplitude changes. Depending on the substance's chemical composition, strong absorption of the signal may be observed at specific frequencies characterized by the chemical composition. The reflected signal exhibits the presence of the absorption frequency band whose amplitude is considerably diminished from the emitted frequency-modulated signal. The isolated absorption frequencies are matched (68) against the experimentally acquired sample image library. The presence of an explosive or other dangerous substance is determined (612).

Figure 10:
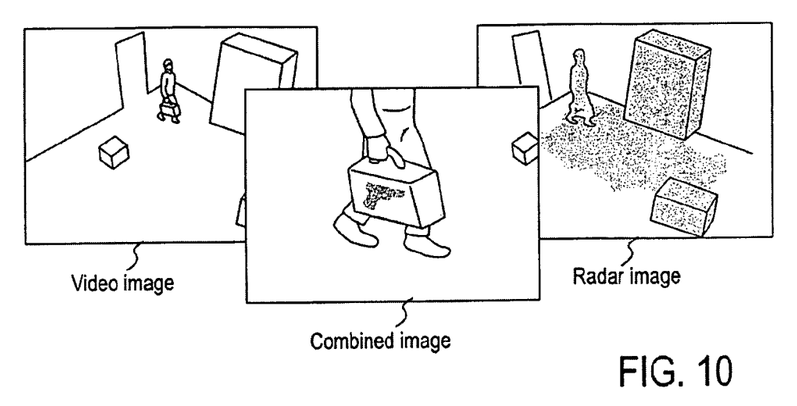
FIG. 10 illustrates an exemplary combined image, according to one embodiment.

When all the information about the analyzed target is obtained, the RSD 100 creates a combined video-radar image of the investigated target 14. The picture can significantly help an operator differentiate suspicious targets from normal targets. FIG. 10 illustrates an exemplary combined image, according to one embodiment.

Figure 11:
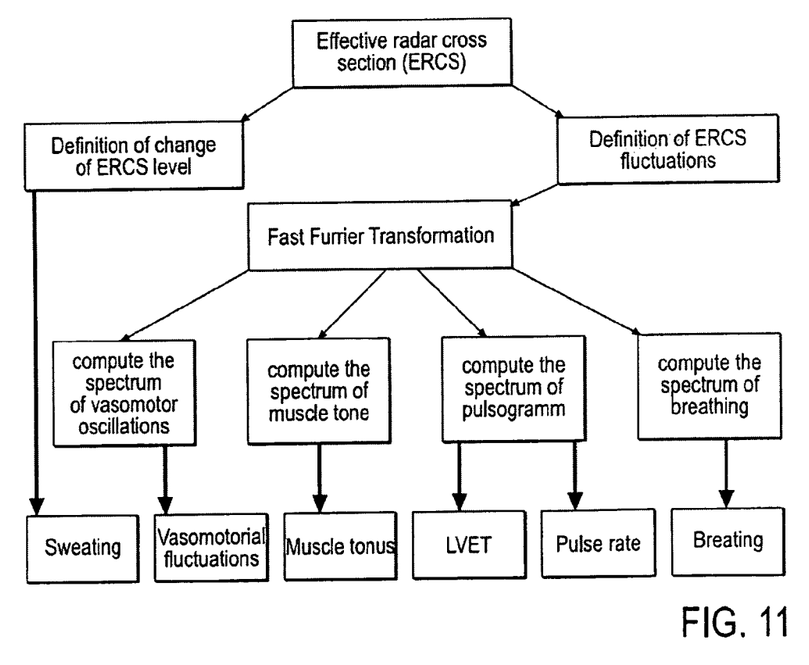
FIG. 11 illustrates a flow diagram of an exemplary process to determine psycho-physiological parameters, according to one embodiment.

FIG. 11 illustrates a flow diagram of an exemplary process to determine psycho-physiological parameters, according to one embodiment. An analysis of the changes in effective radar cross section (ERCS) determines the changes in perspiration. Fluctuations in ERCS give information about plethysmogram, breathing, vasomotorial functions and muscle tonus. Each physiological parameter has its own fluctuation frequency. Typical vasomotorial signals range between 0.0017-0.017 Hz, muscle tonus signals between 0.017-0.17 Hz, breathing signals between 0.08-0.5 Hz, and heart beat signals between within 0.67-4 Hz.

Figure 12:
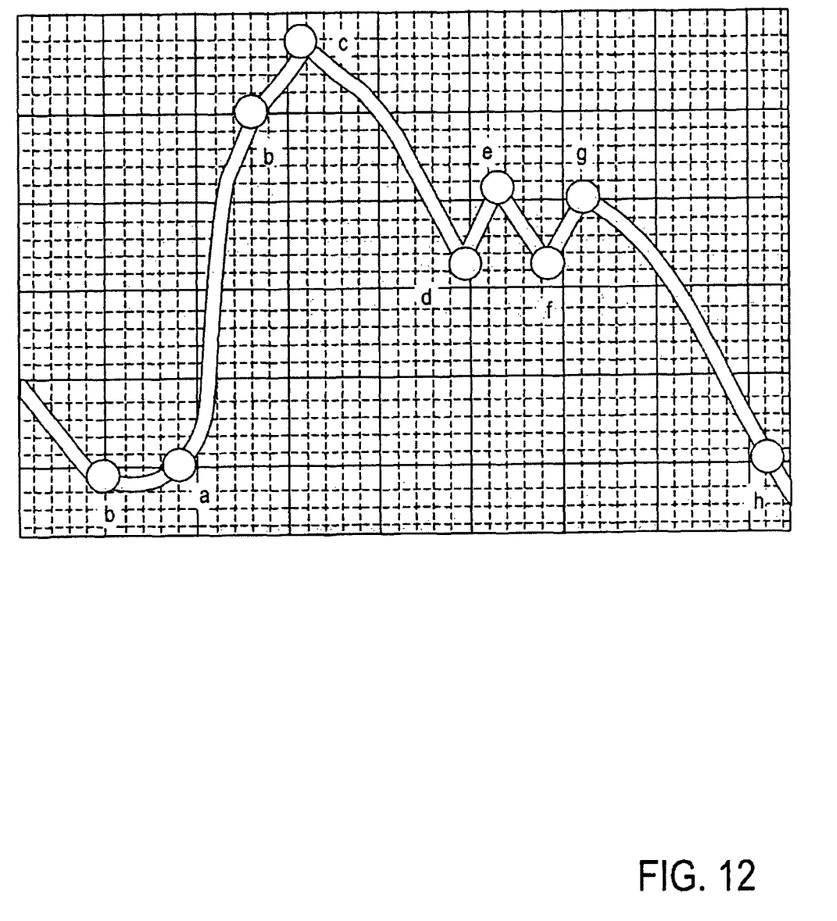
FIG. 12 illustrates an exemplary waveform describing heart-muscle operation, according to one embodiment.

FIG. 12 illustrates an exemplary waveform describing heart-muscle operation, according to one embodiment. From the waveform constructed by the RSD, left ventricular ejection time (LVET) and heart beat can be determined. LVET is the heart parameter (speed of contraction of the left ventricle), which is known to be correlated to "hostile intent." The left ventricle is, in essence, the "pump," which pushes blood on the "large circuit". The right ventricle pumps blood on the smaller respiratory/lung circuit.

RSD 100 detects plethysmogram in real time. A plethysmogram is a derived "measurement" of heart activity. A plethysmogram can be used to evaluate the heart activity and compute LVET based on an analysis of the fluctuations in the amplitude of the reflected signal and the relative position of the characteristic points on the plethysmogram.

FIG. 12 shows a typical heart cycle (plethysmogram) having the following phases of interest: a-b-c is a systole phase with the increased pressure during heart muscle contraction; c-d is the phase of reduction of pressure at the tail end of systole; e is the phase of closing half moon valves; and f-g-h is the phase of reduction of blood pressure during diastole.

Phase a-b-c, the isometric contraction of the ventricle's systole, occurs with closed heart valves. The beginning of this phase coincides with the phase of abrupt increase in the internal to ventricles pressure. The derivative at point 'a' can be used for the analysis of intensity and speed of ventricle operation. The amplitude of a-b-c correlates to the arterial pressure; one of the main parameters of heart operation. Measured peripheral blood pressure can be analyzed as low-pass-filtered arterial pressure.

Therefore, the operation of left ventricle can be characterized by (a) the heartbeat frequency; (b) the speed, with which the left ventricle muscle tissue is changing its tone, e.g. transitions from the relaxed to the contracted state; and (c) the blood pressure created by the left ventricle for opening the valve (instantaneous power of the pump with respect to one blood ejection from the ventricle).

Since the right ventricle operates at an order of magnitude lower power, the plethysmogram of the peripheral pulse provides rich source of information on the physiology of the left ventricle. The processing of physiological parameters make it possible to determine hostile intent of the analyzed target.

The psychological condition of a human being can be characterized by the values of physiological parameters as illustrated in FIG. 11. Depending on the psychological condition, for example stress levels, a person may experience sweating, changes in breathing rate and heart rate, changes in muscle tone, etc. Therefore, changes in physiological parameters of the human body can be observed. These changes are mainly correlated with various hemodynamic changes, (e.g. changes in the amount/volume/presence of blood in various human organs, vessels and muscles). Hemodynamic changes (globally for the entire human being or locally for each body part) can be measured by observing the changes in total ERCS of the observed person and ERCS of each body part separately. The signals pertaining to these psychological parameters are compared with critical and baseline thresholds determined experimentally. Relative changes in values of all relevant observable physiological parameters can be taken into account and compared using predetermined templates or rules. A comparison is made between the observed values with a library of values defining typical various psychological conditions. The differences between the observed values and the values from the library can be used in determining the psychological condition of the observed person and in making subsequent conclusions about the possible hostile intent of the observed person.

A system and method for detecting dangerous objects and substances have been described. It is understood that the embodiments described herein are for the purpose of elucidation and should not be considered limiting the subject matter of the present patent. Various modifications, uses, substitutions, combinations, improvements, methods of productions without departing from the scope or spirit of the present invention would be evident to a person skilled in the art.

We claim:

1. A method, comprising:
   generating a microwave signal;
   transmitting the microwave signal to be reflected by a target to render one or more reflected signals;
   receiving the one or more reflected signals at an antenna array;
   converting each received reflected signal into a low frequency reflected signal;
   converting each low frequency reflected signal into a digital reflected signal to render one or more digital reflected signals;
   converting the microwave signal into a low frequency reference signal;
   converting the generated reference signal into a digital reference signal;
   processing the one or more digital reflected signals and the digital reference signal to determine a three dimensional position of the target; and
   processing the one or more digital reflected signals and the digital reference signal to identify the target.

2. The method of claim 1, further comprising generating a visual representation of the target using the one or more digital reflected signals and the digital reference signal.

3. The method of claim 2, further comprising combining the visual representation of the target with an image of the target obtained from a camera to provide an enhanced target image.

4. The method of claim 3, further comprising using a non-linear digital algorithm that improves resolution of the enhanced target image.

5. The method of claim 1, further comprising:
   generating a digital representation of the target using the one or more digital reflected signals and the digital reference signal; and
   comparing the digital representation of the target with one or more targets stored in a digital library.

6. The method of claim 1, wherein the microwave signal has a parallel polarization relative to the receiving antenna array.

7. The method of claim 1, wherein the microwave signal has a perpendicular polarization relative to the receiving antenna array.

8. The method of claim 1, further comprising determining said identification of the target by using at least one of radioscopic imaging, detecting known resonance frequencies, measuring signal absorption properties of the target, and observing target psycho-physiological parameters.

9. A system, comprising:
   a transmitter in a mobile device including a transmitting antenna, an oscillator, a control circuit of antenna polarization, and a voltage-control circuit oscillator;
   one or more receiving radio channel circuitry in the mobile device, the one or more radio channels circuitry including a receiving antenna, a down converter, a low frequency filter;
   a digital signal processing module in the mobile device; and
   a video display,
   wherein the transmitting antenna transmits a microwave signal to be reflected by an object resulting in the object being a scanned object; and
   wherein the receiving antenna of the one or more receiving radio channels receives reflected signals from a scanned object.

10. The system of claim 9, further comprising a video camera capturing a video image of the scanned object, wherein the video display displays the combined image of a microwave image and the video image of the scanned object, wherein the digital signal processing module generates the microwave image is generated using the reflected signals.

11. The system of claim 9, wherein
   the transmitter transmits signals at a polarization angle with various polarization using the control circuit of antenna polarization;
   the receiving antenna of the one or more receiving radio channels receives the reflected signals reflected from the scanned object on a polarization plane; and
   the polarization angle of the transmitter is parallel or orthogonal to the polarization plane of the receiving antenna of the one or more receiving radio channels.

12. The system of claim 9, wherein the one or more receiving radio channels performs down conversion, low frequency filtering and analog to digital conversion on the reflected signals received by the receiving antenna.

13. A method, comprising:
   generating a microwave signal;
   transmitting the microwave signal to be reflected by a target to render one or more reflected signals;
   receiving the one or more reflected signals at an antenna array;
   converting each received reflected signals into a low frequency reflected signal;
   converting each low frequency reflected signal into a digital signal to render one or more digital reflected signals;
   converting the microwave signal into a low frequency reference signal;
   converting the generated reference signal into a digital reference signal;
   processing the one or more digital reflected signals and the digital reference signal to determine a three dimensional position of the target;
   processing the one or more digital reflected signals and the digital reference signal to identify the target;
   generating a visual representation of the target using the one or more digital reflected signals and the digital reference signal; and
   combining the visual representation of the target with an image of the target obtained from a camera to provide an enhanced target image.

14. The method of claim 13, further comprising using a non-linear digital algorithm that improves resolution of the enhanced target image.

15. The method of claim 13, further comprising:
generating a digital representation of the target using the one or more digital reflected signals and the digital reference signal; and
comparing the digital representation of the target with one or more targets stored in a digital library.

16. The method of claim 13, wherein the microwave signal has a parallel polarization relative to that of the receiving antenna array.

17. the method of claim 13, wherein the microwave signal has a perpendicular polarization relative to that of the receiving antenna array.

18. The method of claim 13, further comprising determining said identification of the target by using at least one of radioscopic imaging, detecting known resonance frequencies, measuring signal absorption properties of the target, and observing target psycho-physiological parameters.

* * * * *

UNITED STATES PATENT AND TRADEMARK OFFICE
CERTIFICATE OF CORRECTION

| | | |
|---|---|---|
| PATENT NO. | : 8,823,581 B2 | Page 1 of 1 |
| APPLICATION NO. | : 11/951915 | |
| DATED | : September 2, 2014 | |
| INVENTOR(S) | : Kirill Mostov and Efim Liptsen | |

It is certified that error appears in the above-identified patent and that said Letters Patent is hereby corrected as shown below:

Title Page, item (75) Inventors should read: Kirill Mostov, Berkeley (CA); Efim Liptsen, Berkeley (CA)

Signed and Sealed this
Twenty-first Day of April, 2015

Michelle K. Lee
*Director of the United States Patent and Trademark Office*